Patented Apr. 1, 1930

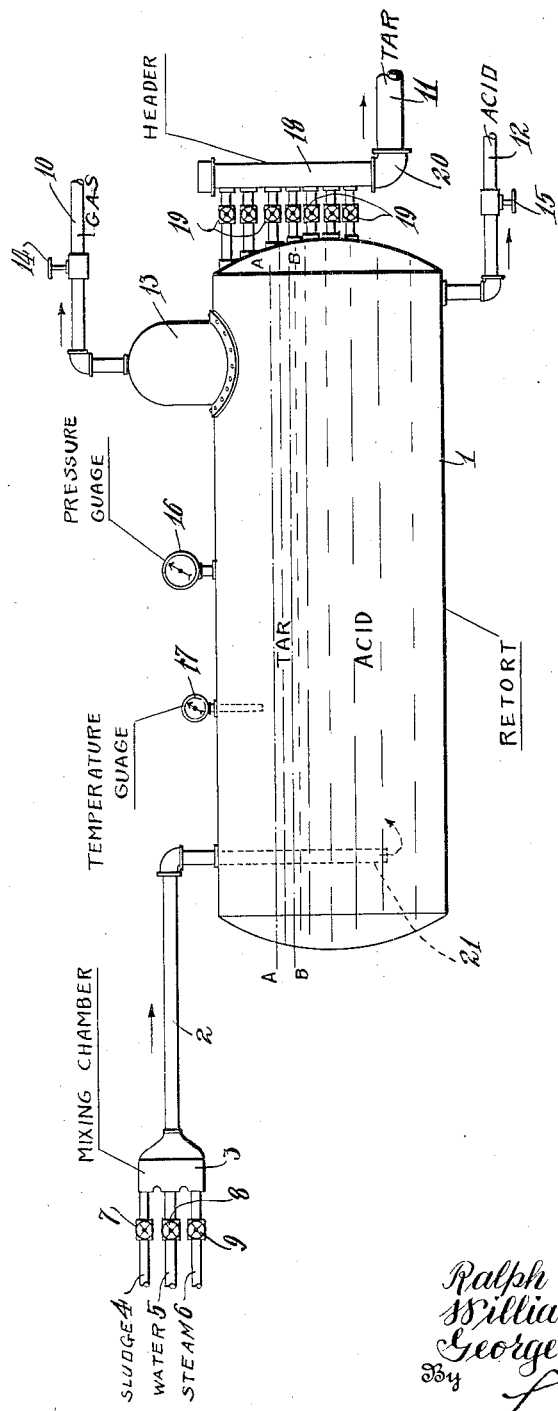

1,752,555

UNITED STATES PATENT OFFICE

RALPH A. HALLORAN, OF BERKELEY, WILLIAM N. DAVIS, OF OAKLAND, AND GEORGE A. DAVIDSON, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

PROCESS OF CONTINUOUSLY HYDROLYZING ACID SLUDGE

Application filed November 15, 1926. Serial No. 148,436.

This invention relates to a process for producing clean weak acid and liquid tar from acid sludge obtained from the sulfuric acid treatment of petroleum oil.

In our Patent No. 1,604,641 issued October 26, 1926, there is described a process for continuously separating a sludge resulting from the treatment of petroleum oil with sulfuric acid into clean weak acid and tar. In accordance with the process of said patent, a heated admixture of sludge and water, or sludge, water and steam is continuously fed into a retort wherein it is held at a hydrolyzing temperature for a period of time sufficient to complete the separation of the sludge into a clean weak acid and tar, being continuously and separately removed from the retort.

We have discovered that the tar liberated from such acid sludge polymerizes after being liberated therefrom if it is held for a prolonged period of time at a high temperature, with the result that it increases in viscosity and, accordingly, its value as a fuel decreases. Moreover, the formation of a heavy viscous tar hinders the gravitation of separated acid through it, frequently making a thorough separation impossible. We have also found that a long retorting period is required in order to produce a clean weak acid.

The general object of the present invention is, therefore, to provide a process for retorting acid sludge continuously, in which the tar and acid which are formed from the process, are discharged from the retort separately and under regulated conditions so that the acid remains in the retort the long period of time necessary for clean separation, while the tar is removed from the retort at a relatively more rapid rate so that polymerization of the tar is prevented.

In accordance with the process of the present invention, acid sludge and water are continuously passed into a retort where the acid sludge and water are maintained at a temperature sufficient to cause efficient hydrolyzation of the sludge into clean weak acid and tar, and wherein said weak acid and tar are permitted to separate into different layers.

The admixture undergoing hydrolysis and stratification is constantly maintained under pressure and the retorting time is sufficient not only to separate the sludge into a tar and acid but also to produce a clean weak acid. While the separation of tar and acid is accomplished, to a large degree, as soon as the sludge, water and steam enter the retort, it is necessary to maintain the acid in the retort for a period of as much as several hours in order to produce clean acid from which all the tarry matter has been completely separated. The tar need be retorted only a short time, for example, one-half hour or less. Accordingly, the process is carried out with a separate withdrawal of tar and acid at such rates as to subject each of said components to the best treating conditions.

In the hydrolysis of acid sludge, it is not sufficient to separate said acid sludge into an acid in which most of the tarry matter has been eliminated, but it is necessary to produce an acid practically free from tarry matter or dissolved sulfuric acid. Otherwise, such sludge acid cannot be properly concentrated for use due to the excessive foaming, carbonization and separation of tar in the concentrating process. The relative time required for separation of the tar and weak acid components of the sludge will, of course, depend somewhat upon the nature of the sludge treated and the temperature used but in each case, a substantially longer treating time should be maintained upon the acid formed than upon the tar formed.

In order to illustrate the advantages accomplished by the process of the present invention, there is hereafter set forth an example of a type of sludge which was subjected to hydrolysis both in a continuous digestor with a regulated draw-off of tar and acid to give the most efficient treatment of these components, and in a batch digestor. It will be noted that the tar was allowed to remain in the batch retort for two hours or until the acid was completely separated from all tarry matter, with the result that the viscosity of the tar was increased from 500 at 210° F. to between 1000 and 10,000 at the same temperature. There is also a notable difference between the capacity of the continuous and batch retorts, the former being almost double that of the latter.

|  | Continuous | | Batch | |
| --- | --- | --- | --- | --- |
|  | Tar | Acid | Tar | Acid |
| Temperature, °F | 350–360 | 340–350 | 340–350 | 340–350 |
| Retorting time, hrs | Approx. .8 | Approx. 3.2 | 2* | 2* |
| Retorting pressure | 70–75 lbs. | | 100 lbs. max. | |
| Acidity | 10.0 | | 10. | |
| Viscosity at 210° F | 500 | | 1000–10,000 | |
| % carbon | | 1.20–1.50 | | 1.70–1.90 |
| Gravity, Bé | | 46°–50° | | 46° |
| Capacity at above time | 960 bbls. per day | | 480 bbls. per day | |

* Counted from time retort reaches the proper temperature.

The present invention also includes an apparatus for retorting of acid sludge, which apparatus has provided the means for readily determining the respective levels of tar and acid in the retort so that said levels may be maintained at the proper position for the most efficient treatment. In the retort disclosed in our Patent No. 1,604,641, a single tar draw-off line at the top of the retort is disclosed together with an acid draw-off line at the bottom of the retort and a gas dome and draw-off line at the top of the retort. With such a type of retort, it is necessary that at all times during operation, the retort be completely filled with liquid or otherwise the tar cannot reach the outlet at the top of the retort. Expansion of the still contents is taken care of only by the dome at the top and skilled operators are required to practice the process because it is difficult to so regulate the withdrawal rates for the tar and acid that both products will be retorted within the proper length of time.

The retort of the present invention is provied with a plurality of vertical spaced draw-off lines for the tar, by which the liquid levels may be maintained at any desired position. Various further objects and advantages of the present invention will be apparent from a description of a preferred form of process and apparatus embodying the invention. For this purpose, reference is made to the accompanying drawings in which there is illustrated a preferred form, or example, of a retort embodying our invention and which retort may be employed for carrying out a preferred form or example of a process which embodies this invention.

The drawing represents a diagrammatic elevation of the retorting apparatus.

In the drawings, 1 indicates a retort which is provided with a feed line 2 which preferably enters near one end of the retort and discharges at a point 21, which is preferably below the level at which it is proposed to maintain the liquid within the retort. The feed line 2 is preferably provided with a triple connection 3 to which lines 4, 5, and 6 are connected, which conduct the sludge to be hydrolyzed, the water for hydrolysis, and the steam, if steam is to be employed or introduced at this point. While there is shown a triple connection or mixing device 3 outside the retort 1, it is obvious that a similar means for commingling the supplies might be provided inside the retort 1. The lines 4, 5, and 6 are preferably provided with valves 7, 8 and 9 for regulating the supplies of the different feeds.

The retort 1 is provided with a gas discharge line 10, a tar discharge line 11 and an acid discharge line 12. The discharge lines are preferably connected to the retort at the opposite end from the feed line 2. The gas discharge line 10 may be connected to a gas dome 13. The gas discharge line 10 and the acid discharge line 12 are provided with suitable valves 14 and 15, respectively, for regulation of the discharge ratio and pressure within the system. The retort is also preferably provided with a pressure gage 16 indicating the pressure within the retort and a temperature gage 17.

An important feature of the present invention is the use of a manifold 18, comprising a series of vertically spaced valve outlets 19.

Although the drawings show the manifold 18 as communicating with the upper portions of the retort, it may also be made to communicate with the lower portions of the retort and may have the outlets 19 any desired distance apart. The manifold 18 is connected at its lower end by a suitable means such as the elbow 20 to the tar discharge line 11. The purpose of the manifold 18 is first to permit the determination of the depths of the acid and tar layers and, second, to permit the withdrawal of the tar from any desired level.

The preferred process as carried out with said apparatus is as follows:

Acid sludge, water and steam are continuously commingled in the feed line 2 and introduced into the retort 1. The proportions of water, steam and sludge are regulated by operation of the valves 7, 8, and 9 so that the sulfuric acid, which is produced, will be diluted to a specific gravity usually not greater than 1.526 (50° Beaumé) and so that the heats applied by the steam, together with the heat of reaction of the acid and sludge, are sufficient to raise the commingled mass to the hydrolyzing temperature, commonly between 330° F. and 375° F.

It will be further understood that heat may be employed by other means than the steam such, for example, as by preheating the acid sludge or water, or both, or by heating the mixture after commingling by any particular means, such as by the use of a closed steam coil.

It will also be understood that if steam is used for heating, it may be employed to provide the water for hydrolysis and no additional water need be added. It is preferable, however, to employ both water and steam and conduct the heating through the use of steam and without the addition of further heat to the admixture either within or without the retort.

In operation, the retort is held under a pressure sufficient to maintain the aforesaid required temperature, the pressure being commonly over 50 lbs. gage. The retort is preferably properly insulated to conserve the heat of reaction and the heat supplied by the materials so that a body of material may be maintained in the retort at the hydrolyzing temperature for the desired length of time.

It has been found that by the aforesaid means of commingling the feed, the hydrolysis is practically complete when it enters the retort 1. The acid sludge hydrolyzes into tar and sulfuric acid which separate into layers in the retort as indicated by the tar level A—A and the acid level B—B. The acid appears as the lowest layer in the retort and is continuously withdrawn through the line 12, the rate being regulated by means of valve 15. The tar forms the upper layer and is continuously withdrawn through one of the valve outlets 19 corresponding to the level A—A.

The rate of the supply of the feed and withdrawal of the products are necessarily maintained equal after the process is once under full operation and this rate must not exceed the rate of separation of the various constituents.

An important feature of the present process is that the acid and tar are not maintained in the retort for equal periods of time. It will be observed that when the feed and discharge rates are maintained equal, the relative volumes of acid and tar in the retort will remain constant. The time required for the acid or tar to pass through and out of the retort will depend upon the volumes of acid and tar, respectively, in the retort. Thus, if the sludge fed into the retort yields equal amounts of tar and acid and there is one volume of tar to ten volumes of acid maintained in the retort, it will require ten times as long for a given particle of acid to pass through the retort as will be required for the passage of a given particle of tar. Where the acid sludge fed into the retort produces a greater ratio of tar to acid than as above indicated, the relative treating time of the tar will be greater than as above indicated. It will be apparent that by proper regulation of the relative volumes of tar and acid maintained in the retort any desired relative treating time between the tar and acid may be maintained. It will be seen that by maintaining in the retort a predetermined volume ratio of acid to tar, the respective treating times for the acid and tar will be controlled. The relative volumes and hence the relative treating times may be readily made to assume any desired ratio by the simple expedient of raising or lowering the layers A—A or B—B. Preferably the relative treating times of the tar and acid are maintained at a ratio greater than one to two, and preferably the treating times are approximately thirty minutes for the tar and two hours for the acid.

When the operation is being started, the commingled acid sludge, steam and water are passed into the retort and the hydrolyzed acid and tar allowed to accumulate until the desired acid level B—B is reached. This level may be located either by means of the various outlets 19 in the manifold 18 or by means of a separate series of samples which may be in any suitable form, such as pet cocks. When the acid level has reached the desired height, the acid valve 15 is set to permit the discharge of acid at a rate corresponding to its rate of separation from the tar. The tar level is then set by means of the series of valves 19 so that the tar level is of the desired depth. All of the valves 19 except the one at the desired level, remain closed. The tar is permitted to discharge at a rate so that the pressure in the retort will not be diminished.

While the process herein described is well adapted for carrying out the objects of the present invention, it is understood that various modifications and changes may be made without departing from the invention, and the invention includes all such modifications and changes as come within the scope of the following appended claims.

We claim:

1. A process of hydrolyzing acid sludge obtained in the acid treatment of petroleum oil, which consists in passing said acid sludge and water into a chamber wherein the materials are maintained at a hydrolyzing temperature and withdrawing the produced separated acid and tar from said chamber, a volume of separated acid in the chamber being maintained sufficiently in excess of the volume of separated tar so that the acid is subjected to hydrolyzing temperature for a substantially greater period of time than the tar.

2. A process of hydrolyzing acid sludge obtained from the acid treatment of petroleum oil, which comprises continuously passing acid sludge and water into a chamber, therein maintaining the materials at a hydrolyzing temperature and under a corresponding pressure, therein maintaining a sufficiently greater volume of separated acid than separated tar so that the separated acid is maintained in the chamber at the hydrolyzing temperature for a substantially greater period of time than the tar, and continuously withdrawing said tar and said acid.

3. A process of hydrolyzing acid sludge obtained from the acid treatment of petroleum oil, which consists in passing a heated mixture of acid sludge and water into a chamber under sufficient pressure to maintain a hydrolyzing temperature in the chamber, therein regulating the respective volumes of produced acid and tar so that the produced acid is maintained within the retort for a substantially greater period of time than the produced tar and so that the produced acid is subjected to hydrolyzation for a sufficient period of time to complete the reaction while the tar is subjected to the hydrolyzing temperature for a relatively short period of time insufficient to produce coking of the tar, and separately withdrawing the acid and tar from the chamber.

4. A continuous process of hydrolyzing acid sludge obtained from the acid treatment of petroleum oil, which consists in passing an admixture of acid sludge and water heated to a hydrolyzing temperature into a chamber under a pressure sufficient to maintain a hydrolyzing temperature in the chamber, maintaining in said chamber the volume of separated acid sufficiently greater than the volume of tar so that the separated acid is maintained in the chamber for a period of time substantially in excess of the period of time the tar is maintained therein and a sufficient time for completing the hydrolyzation of said acid while at the same time the tar is maintained in the chamber an insufficient period of time for the conversion of said tar to coke, and continuously withdrawing said clean weak acid and liquid tar from said chamber.

Signed at Richmond, California, this 25th day of October, 1926.

RALPH A. HALLORAN.
WILLIAM N. DAVIS.
GEORGE A. DAVIDSON.

CERTIFICATE OF CORRECTION.

Patent No. 1,752,555.                    Granted April 1, 1930, to

RALPH A. HALLORAN ET AL.

It is hereby certified that error appears in the printed specification of the above numbered patent requiring correction as follows: Page 2, after line 10, the percentage of carbon defined in the chart under the heading "Batch," "Acid," should read 1.70-1.90 instead of 1.70-190; and that the said Letters Patent should be read with this correction therein that the same may conform to the record of the case in the Patent Office.

Signed and sealed this 2nd day of September, A. D. 1930.

(Seal)

M. J. Moore,
Acting Commissioner of Patents.